United States Patent
King et al.

(10) Patent No.: US 6,694,337 B1
(45) Date of Patent: Feb. 17, 2004

(54) SYNCHRONIZING DATABASES

(75) Inventors: David A. King, Highland, UT (US); Eric B. Remer, American Fork, UT (US); David L. Remer, Orem, UT (US); John C. Allen, Pleasant Grove, UT (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 09/698,432

(22) Filed: Oct. 26, 2000

(51) Int. Cl.$^7$ ............................................. G06F 12/00
(52) U.S. Cl. ................................. 707/201; 707/203
(58) Field of Search ................................ 707/203, 202, 707/2, 10

(56) References Cited

U.S. PATENT DOCUMENTS

| | | | | |
|---|---|---|---|---|
| 4,631,673 A | * | 12/1986 | Haas et al. ................ 707/100 |
| 5,666,526 A | * | 9/1997 | Reiter et al. .................. 707/2 |
| 5,675,802 A | * | 10/1997 | Allen et al. ................ 707/203 |
| 5,745,904 A | * | 4/1998 | King et al. ................. 707/200 |
| 5,806,075 A | * | 9/1998 | Jain et al. .................... 707/10 |
| 5,819,272 A | * | 10/1998 | Benson ......................... 707/8 |
| 5,893,911 A | * | 4/1999 | Piskiel et al. ............... 709/203 |
| 5,926,816 A | * | 7/1999 | Bauer et al. ................ 707/201 |
| 5,946,689 A | * | 8/1999 | Yanaka et al. ................ 707/10 |
| 6,078,930 A | * | 6/2000 | Lee et al. ................... 707/202 |
| 6,122,630 A | * | 9/2000 | Strickler et al. ............. 707/10 |
| 6,125,368 A | * | 9/2000 | Bridge et al. .............. 707/201 |
| 6,182,286 B1 | * | 1/2001 | Sigal et al. ................. 717/122 |
| 6,233,575 B1 | * | 5/2001 | Agrawal et al. ............... 707/6 |
| 6,243,702 B1 | * | 6/2001 | Bamford et al. ............... 707/8 |
| 6,321,236 B1 | * | 11/2001 | Zollinger et al. ........... 707/203 |
| 6,341,285 B1 | * | 1/2002 | Blott et al. .................... 707/8 |
| 6,343,299 B1 | * | 1/2002 | Huang et al. ............... 707/203 |
| 6,363,389 B1 | * | 3/2002 | Lyle et al. .................. 709/201 |
| 6,438,558 B1 | * | 8/2002 | Stegelmann ................ 707/200 |
| 6,438,563 B1 | * | 8/2002 | Kawagoe .................... 707/201 |
| 6,446,092 B1 | * | 9/2002 | Sutter ......................... 707/203 |
| 6,449,622 B1 | * | 9/2002 | LaRue et al. ............... 707/201 |
| 6,470,329 B1 | * | 10/2002 | Livschitz ....................... 707/1 |
| 6,493,727 B1 | * | 12/2002 | Huang et al. ............... 707/201 |
| 6,516,327 B1 | * | 2/2003 | Zondervan et al. ......... 707/200 |
| 6,529,917 B1 | * | 3/2003 | Zoltan ........................ 707/201 |
| 6,532,479 B2 | * | 3/2003 | Souder et al. .............. 707/201 |

* cited by examiner

*Primary Examiner*—Kim Vu
*Assistant Examiner*—Monplaisir Hamilton
(74) *Attorney, Agent, or Firm*—Fish & Richardson P.C.

(57) ABSTRACT

A computer that manages a master database synchronizes the master database and a slave database by receiving a change made to the slave database, integrating the change to the slave database into the master database, and sending, to a second computer that manages the slave database, a portion of the master database that has changed since a previous synchronization operation between the master and slave databases.

10 Claims, 2 Drawing Sheets

SYNCHRONIZING DATABASES

TECHNICAL FIELD

This invention relates to synchronizing databases.

BACKGROUND

Copying changes made in one database to another database is known as database synchronization. Synchronization is typically performed to ensure that changes made to a master database are propagated to its slave databases and vice versa. A master database is one that maintains sets of data tables that are referenced by the slave databases, often in a so-called "hub and spoke" arrangement.

DESCRIPTION

Figure 1:
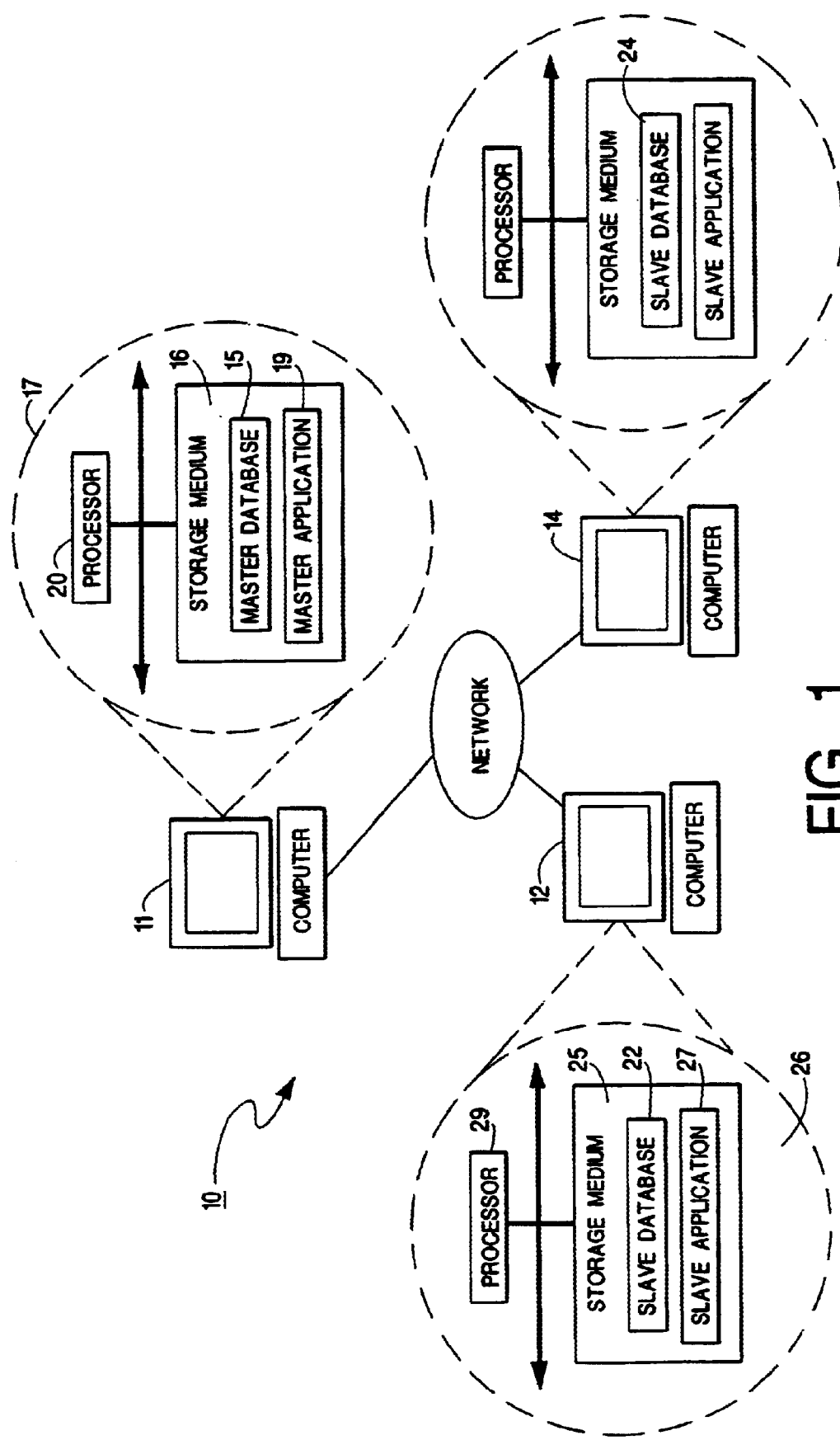
FIG. 1 is a block diagram of a computer system that includes master and slave databases.

FIG. 1 shows a hub and spoke database arrangement 10, which includes one or more computers connected via a network, such as a local area network (LAN), a wide area network (WAN), and/or the Internet. Computers 11, 12 and 14 may be servers, personal computers (PCs), or any other type of processing device that is capable of managing a database.

Figure 2:
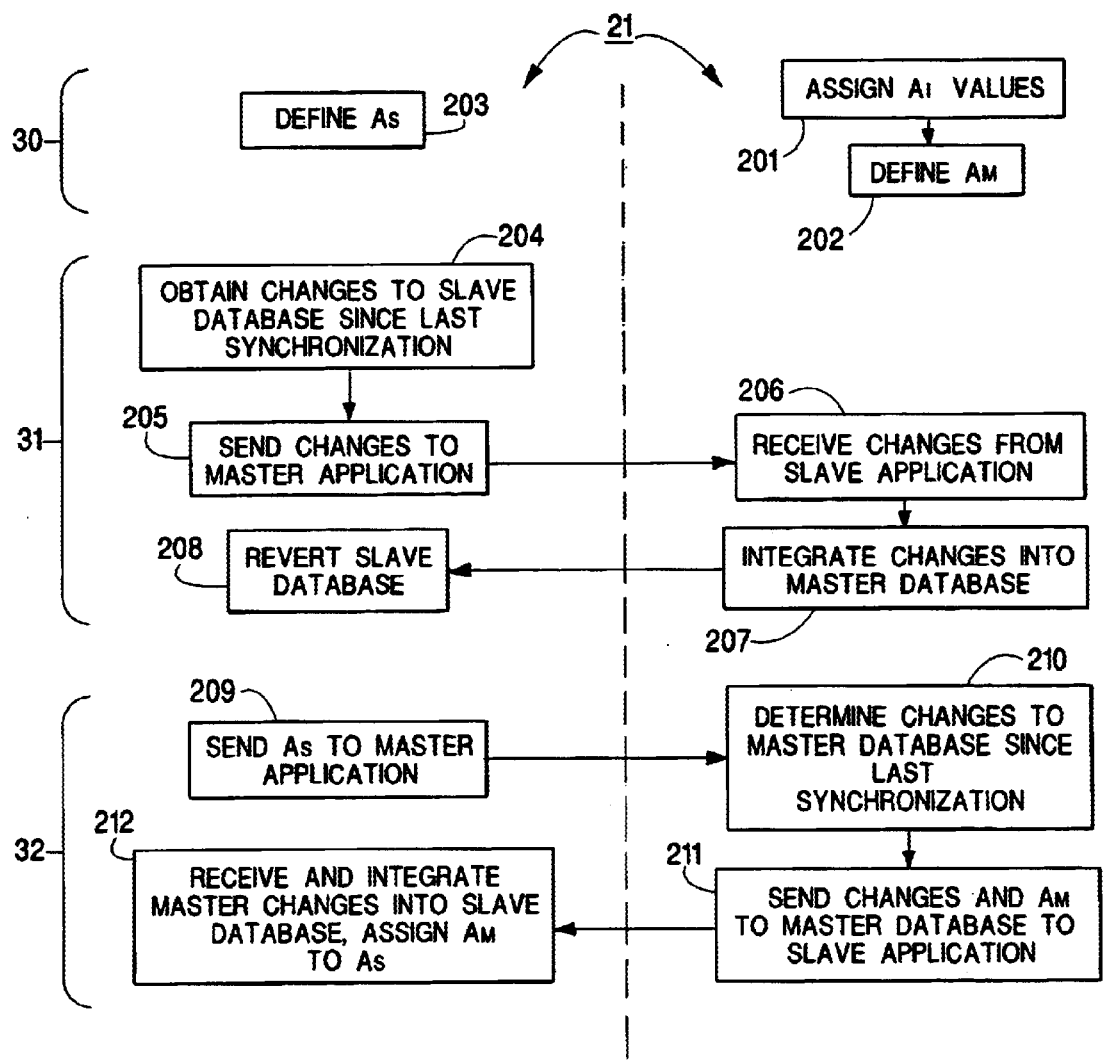
FIG. 2 is a flowchart showing a process for synchronizing the master and slave databases shown in FIG. 1.

Computer 11 manages a master database 15. Master database 15 is stored in memory 16 or other storage area of computer 11 (see view 17). A "master" database management application 19 (hereinafter "master application"), which includes computer-executable instructions, is also stored in memory 16. Processor 20 executes master application 19 to perform the "master" portion of the database synchronization process 21 of FIG. 2. The master portion of process 21 is shown on the right side of FIG. 2.

Computers 12 and 14 manage slave databases 22 and 24 respectively. For the purposes of this disclosure, computers 12 and 14, and respective databases 22 and 24, are identical. Accordingly, only slave database 22 and corresponding computer 12 are described in detail. It is noted, however, that process 21 is not limited to use with identical databases and computers. Also, although only two slave databases are shown, process 21 can be used to synchronize any number of databases.

Slave database 22 is stored in memory 25 or other storage area of computer 12 (see view 26). Slave database 22 may be identical to master database 15 or it may contain a subset thereof. A "slave" database management application 27 (hereinafter "slave application"), which includes computer-executable instructions, is also stored in memory 25. Processor 29 executes slave application 27 to perform the "slave" portion of database synchronization process 21. The slave portion of process 21 is on the left side of FIG. 2. Process 21 is described with respect to slave database 22, even though it is also performed by other databases in communication with master database 15.

Process 21 includes preprocessing phase 30, post phase 31, and get phase 32. The post and get phases are so named because they refer to a slave database "posting" its changes to the master database and the slave database "getting" changes from the master database.

The schema (S) of master database 15 includes a set of tables (T) and is defined as follows $$S_M = \{T_{M1}, T_{M2} \ldots T_{Mn}\},$$

where the "M" stands for "master". Each $T_{Mi}$ ($i \leq n$) is a table in master database 15. Each table, $T_{Mi}$, is defined by rows and columns (C), such that $$T_{Mi} = \{C_{M1}, C_{M2} \ldots C_{Mn}\}.$$

In preprocessing phase 30, master application 19 assigns (201) an "age variable" ($A_i$) column to each table $T_{Mi}$. The age variable is indicative of a number of changes made to a row in master database 15, as described below. Thus, each $T_{Mi}$ is defined as $$T_{Mi} = \{C_{M1}, C_{M2} \ldots C_{Mn}, A_i\}.$$

Master application 19 also defines (202) a global age variable $A_M$ for master database 15 and stores $A_M$ in association with master database 15. $A_M$ is initialized to zero (0), as is every $A_i$ value in $T_{Mi}$. From this point on, for every database operation that inserts or updates a row in any table of master database 15, master application 19 increments $A_M$ by one and sets the $A_i$ value in the row to the new $A_M$ value. When a row is deleted, master application 19, instead of actually deleting the row in master database 15, increments the value of $A_M$ to indicate a database operation and sets the $A_i$ value in the deleted row to be the negative of $A_M$ ($-A_M$)

Thus, master application 19 maintains the global age $A_M$ for master database 15 and records changes to each row in master database 15 by incrementing $A_M$ each time a change (update, insert, or delete) occurs and setting that row's $A_i$ value equal to the incremented $A_M$ value or its negative.

Referring now to slave database 22, the schema (S) of slave database 22 includes a set of tables (T) and is defined as follows $$S_S = \{T_{S1}, T_{s2} \ldots T_{Sn}\},$$

where the "S" stands for "slave". Each $T_{Si}$ ($i \leq n$) is a table in slave database 22. Each table, $T_{Si}$ is defined by rows and columns (C), such that $$T_{Si} = \{C_{S1}, C_{S2} \ldots C_{Sn}\}.$$

The schema of slave database 22 can be identical to, or a subset of, the schema of master database 15.

In preprocessing phase 30, slave application 27 defines (203) a global age variable $A_S$ for slave database 22 and stores $A_S$ in association with slave database 22. $A_S$ is initialized to zero (0) when slave database 22 is initially created. The value of $AA_S$ is modified when a synchronization operation occurs, as described below.

The operations that occur during preprocessing phase 30 need not occur in the order described above. For example, the slave operations may occur before the master operations or the two may occur substantially concurrently.

Slave application 27 initiates a database synchronization operation by obtaining (204) all of the changes to slave database 22 that were made since a last database synchronization operation. Slave application 27 may keep a record, e.g., in memory 25, of the changes to slave database 22 as they occur. Slave application 27 obtains this record from memory and sends (205) the changes to master application 19 (on computer 11).

Master application 19 receives (206) the changes from slave application 27 and integrates (207) the changes to slave database 22 into master database 15. For example, master application 19 makes any updates (e.g., to $A_M$ and $A_{Mi}$), additions or deletions to rows/columns of master database 15 that were previously made to slave database 22.

Slave application 27 reverts (208) slave database 22 back to its state at the time of the previous synchronization operation, i.e., before any of the changes sent (205) to master database were made. These changes are re-incorporated into slave database 22 via master database 15, as described below.

Slave application 27 initiates get phase 32 by sending (209) the slave age variable (data) $A_S$ to master application 19. Master application 19 receives $A_S$ and determines (210), based on $A_S$, which rows of master database have changed since the last synchronization operation and, thus, which rows should be sent to slave database 22 during synchronization. This is done by comparing the value of $A_S$, to the value $A_{Mi}$ of each row. If $A_{Mi}$ is greater than $A_S$, master application 19 knows that the row corresponding to $A_{Mi}$ has changed since the last synchronization operation. In addition, master application 19 queries master database 15 for all rows having an age that is less than the value of $-A_S$. This is done to determine if a row has been deleted from master database 15.

Once master application 19 determines which rows of master database 15 have changed (i.e., been updated, added or deleted) since the last synchronization operation, master application 19 gathers the changes and sends (211) the changes to slave application 27 (on computer 12). Slave application 27 receives the changes and integrates (212) the changes into slave database 22. Master application 19 sends slave application 27 enough information about the changed rows (e.g., primary keys and the like) to allows slave application 27 to integrate the changes into slave database 22. Master application 19 also sends (211) slave application the global age variable AM. Slave application 27 receives AM and assigns the value of $A_M$ to $A_S$, to record, at the slave database, the "age" of the master database at the time of the last synchronization operation, where "age" is measured by $A_M$.

Process 21 is not limited to use with the database configurations shown in FIG. 1 or to use with the hardware and software FIG. 1; it may find applicability in any computing or processing environment. Process 21 may be implemented in hardware, software, or a combination of the two. Process 21 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform process 21 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 21. Process 21 may also be implemented as a computer-readable storage medium, configured with a computer program, where, upon execution, instructions in the computer program cause the computer to operate in accordance with process 21.

Process 21, implemented by master application 19 and slave application 27, is executed outside of a database management system (DBMS). This allows synchronization to occur without a direct connection between the master and slave database systems. Process 21 can be used with any database schema and can be used to synchronize any changed portions of two databases, not just rows as described herein.

Other embodiments not described herein are also within the scope of the following claims.

What is claimed is:

1. A method comprising:

for every insertion of a row or updating to the row in a table of a master database, incrementing a master global number and setting a master row number for the row to the master global number, wherein there is one master row number for every row in every table of the master database;

receiving all changes to a slave database that were made since a last database synchronization between the master database and the slave database;

updating the master database with the changes;

reverting the slave database back to a state of the slave database when the last database synchronization occurred;

receiving a slave global number that represents a value of the master global number when the last database synchronization occurred;

determining any rows of the master database with master row numbers that are higher than the slave global number indicating that the rows were inserted or updated since the last database synchronization occurred; and for every deletion of a row in a table of the master database from a view, incrementing the master global number and setting the master row number for the deleted row to a negative value of the master global number.

2. The method of claim 1 further comprising:

determining any rows of the master database with master row numbers that are lower than a negative value of the slave global number indicating that the rows were deleted from the view since the last database synchronization occurred.

3. The method of claim 2 further comprising:

sending information about the rows of the master database which, if any, have master row numbers that are higher than the slave global number or lower than the negative value of the slave global number.

4. The method of claim 3 wherein the sending further comprises sending from one computer to a second computer the information comprising which, if any, rows of the master database have master row numbers that are higher than the slave global number and the current data in these rows.

5. The method of claim 3 wherein the sending further comprises sending from one computer to a second computer the information comprising which, if any, rows of the master database have master row numbers that are lower than the negative value of the slave global number.

6. An apparatus comprising:

a first memory that stores a first set of computer instructions and a master database, wherein a first processor executes the first set of computer instructions to:

for every deletion of a row in a table of the master database from a view, increment the master global number and set the master row number for the deleted row to a negative value of the master global number;

the first processor with access to the first memory;

a second memory that stores a second set of computer instructions and a slave database; and a second processor with access to the second memory, wherein the first processor executes the first set of computer instructions to:

for every insertion of a row or updating to the row in a table of the master database, increment the master global number and set the master row number for the row to the master global number, wherein there is one master row number for every row in every table of the master database;

receive, from the second processor, all change to the slave database that were made since a last database synchronization between the master database and the slave database occurred;

update the master database with the changes;

receive, from the second processor, a slave global number that represents a value of the master global number when the last database synchronization occurred, and determine any rows of the master database with master row numbers that are higher than the slave global number indicating that the rows were inserted or updated since the last database synchronization occurred, wherein the second processor executes the second set of computer instructions to revert the slave database back to a state of the slave database when the last database synchronization occurred.

7. The apparatus of claim 6 wherein the first processor executes the first set of instructions to:

determine any rows of the master database with master row numbers that are lower than a negative value of the slave global number indicating that the rows were deleted from the view since the last database synchronization occurred.

8. The apparatus of claim 7 wherein the first processor executes the first set of instructions to:

send, to the second processor, information about the rows of the master database which, if any, have master row numbers that are higher than the slave global number or lower than the negative value of the slave global number.

9. The apparatus of claim 8 wherein the information comprises which, if any, rows of the master database have master row numbers that are higher than the slave global number and the current data in these rows.

10. The apparatus of claim 8 wherein to send further comprises to send information about the rows of the master database which, if any, have master row numbers that are higher than the slave global number or lower than the negative value of the slave global number.

* * * * *